(12) United States Patent
Montañà Caelles et al.

(10) Patent No.: US 12,709,429 B2
(45) Date of Patent: Aug. 18, 2026

(54) PACKAGING MACHINE

(71) Applicant: VOLPAK, S.A.U., Santa Perpetua de Mogoda (ES)

(72) Inventors: Xavier Montañà Caelles, Santa Perpetua de Mogoda (ES); Albert Grau Calvó, Santa Perpetua de Mogoda (ES)

(73) Assignee: VOLPAK, S.A.U., Santa Perpetua de Mogoda (ES)

( * ) Notice: Subject to any disclaimer, the term of this patent is extended or adjusted under 35 U.S.C. 154(b) by 0 days.

(21) Appl. No.: 18/653,487

(22) Filed: May 2, 2024

(65) Prior Publication Data

US 2024/0367841 A1 Nov. 7, 2024

(30) Foreign Application Priority Data

May 3, 2023 (IT) ........................ 102023000008763

(51) Int. Cl.
*B65B 57/02* (2006.01)
*B65B 43/46* (2006.01)
(Continued)

(52) U.S. Cl.
CPC ............ *B65B 57/02* (2013.01); *B65B 43/465* (2013.01); *B65B 57/04* (2013.01); *B65B 65/00* (2013.01);
(Continued)

(58) Field of Classification Search
CPC ....... B65B 43/42; B65B 43/465; B65B 57/02; B65B 57/04; B65B 57/06; B65B 59/003;
(Continued)

(56) References Cited

U.S. PATENT DOCUMENTS 3,028,796 A * 4/1962 Neuendorf .............. B31B 50/00
493/236
3,354,613 A * 11/1967 Anderson ............. B65B 25/065
198/463.3
(Continued)

FOREIGN PATENT DOCUMENTS

WO 03/082679 A1 10/2003
WO 2018/024365 A1 2/2018

OTHER PUBLICATIONS

Search Report completed Dec. 15, 2023 issued in Italian Application No. 202300008763.

*Primary Examiner* — Robert F Long
*Assistant Examiner* — Eduardo R Ferrero
(74) *Attorney, Agent, or Firm* — Sughrue Mion, PLLC

(57) ABSTRACT

A packaging machine comprising a track with a number of carriage assemblies moveable along the track and able to hold in a suspended fashion a flexible pouch and to convey them along at least a section of the track; a series of processing modules moveably engaged with a common supporting rail, the processing modules having configurable tools able to perform an operation on the conveyed pouches; and a corresponding series of control units, each control unit to control the configurable tools of a processing module or the configurable tools of a set of functionally-related processing modules, the control units being moveably engageable in a static frame to which the supporting rail of the processing modules is also solidly joined to.

19 Claims, 10 Drawing Sheets

(51) Int. Cl.
*B65B 57/04* (2006.01)
*B65B 65/00* (2006.01)
*B65G 17/32* (2006.01)
*B65G 54/02* (2006.01)
*B65G 47/90* (2006.01)

(52) U.S. Cl.
CPC ............. *B65G 17/32* (2013.01); *B65G 54/02* (2013.01); *B65B 65/003* (2013.01); *B65G 17/323* (2013.01); *B65G 47/90* (2013.01)

(58) Field of Classification Search
CPC ....... B65B 59/04; B65B 65/00; B65B 65/003; B65G 17/32; B65G 17/323; B65G 47/90; B65G 54/02
See application file for complete search history.

(56) References Cited

U.S. PATENT DOCUMENTS 3,537,225 A * 11/1970 Fields ..................... B65B 9/093 53/410
3,851,751 A * 12/1974 Jones ..................... B65B 43/30 198/803.5
4,330,288 A * 5/1982 Russell ................... B65B 43/34 198/377.07
4,352,669 A * 10/1982 Norton ..................... A61J 1/10 493/213
4,509,313 A * 4/1985 Koppe .................... B65B 39/00 53/570
4,617,785 A * 10/1986 Chikatani ............... B65B 43/34 53/562
5,058,364 A * 10/1991 Seiden .................. B65B 43/123 53/562
5,845,466 A * 12/1998 Laudenberg .......... B65B 43/465 53/550
5,862,653 A * 1/1999 Solano .................. B65B 43/465 53/562
5,975,280 A * 11/1999 Cote ...................... B65H 29/02 198/474.1
6,199,351 B1 * 3/2001 Mount ...................... B65B 1/02 53/563
6,349,526 B1 * 2/2002 Newman ................... B07C 5/10 53/425
9,555,513 B2 * 1/2017 Schmeiser .............. B65B 47/00
9,944,037 B2 * 4/2018 Murray ..................... B65B 1/02
10,577,136 B2 * 3/2020 Burk ....................... B65B 43/56
11,440,687 B2 * 9/2022 Furlotti ............ B29C 66/81427
11,787,645 B2 * 10/2023 Solà Gil ................. B65B 43/32 198/468.2
11,807,464 B2 * 11/2023 Borghi .................... B65B 57/00
12,145,754 B2 * 11/2024 Lelie ....................... B65B 49/10
2001/0009089 A1 * 7/2001 Todd ....................... B29C 65/18 53/64
2003/0075853 A1 * 4/2003 Hansch ..................... B42C 1/10 270/52.17
2003/0098219 A1 * 5/2003 Mader .................... B65H 33/04 198/678.1
2003/0230941 A1 * 12/2003 Jacobs ................. B65G 47/841 310/12.19
2004/0014577 A1 * 1/2004 Hiramoto ............ B29C 65/7882 493/197
2006/0259195 A1 * 11/2006 Eliuk ................. B01F 33/8442 700/245
2007/0089377 A1 * 4/2007 Yasuhira ............... B65B 43/465 53/469
2013/0152516 A1 * 6/2013 Sammons ................. B65B 7/02 53/562
2014/0041992 A1 * 2/2014 Rudick ................ B65G 54/025 198/465.2
2015/0197353 A1 * 7/2015 Bergmann ................ B65B 5/12 53/154
2016/0122063 A1 * 5/2016 Garriga Jimenez .... B65B 43/04 198/803.4
2017/0050332 A1 * 2/2017 Bauer ................ A22C 17/0093
2017/0088298 A1 * 3/2017 McLenithan ........... B65B 61/06
2017/0320683 A1 * 11/2017 Walter .................... B60L 13/03
2017/0361967 A1 * 12/2017 Campagnoli ........... B65B 43/60
2018/0265230 A1 * 9/2018 Burk ...................... B65G 54/02
2018/0362269 A1 * 12/2018 Marcantoni ............. B65C 9/045
2019/0092572 A1 * 3/2019 Fujii ...................... B65G 35/06
2019/0233152 A1 * 8/2019 Nakamoto .............. B65B 51/32
2020/0002040 A1 * 1/2020 von Birgelen ......... B65G 23/23
2020/0385221 A1 * 12/2020 Tanaka ............... B65G 21/2054
2021/0122576 A1 * 4/2021 Jones ..................... B65G 35/06
2021/0403246 A1 * 12/2021 Borghi ................... B65G 43/04
2022/0315356 A1 * 10/2022 Solà Gil ............... B65B 59/003
2023/0294929 A1 * 9/2023 Okazaki .................... B65B 7/16 198/803.7
2024/0051695 A1 * 2/2024 Mondini ................... B65B 5/04

* cited by examiner 100
14
10b
10a
13
15
10c
1
12
102
101
10d 13
13b
13a
15
15a
15b
12
12a
12b
1
10a
10c
101

PACKAGING MACHINE

TECHNICAL FIELD OF THE INVENTION

The invention relates to a packaging machine, particularly a horizontal-type automatic packaging machine prepared to at least open, fill and seal containers in the form of flexible pouches.

BACKGROUND OF THE INVENTION

Horizontal-type automatic packaging machines including a conveyor device moving a plurality of carriages along a closed path provided with working sections, along which processing units such as one or more filling units and one or more sealing unit are installed, are known.

The appearance of controlled motion systems with magnetically driven movers movably mounted on a track, such as that disclosed in the patent document US2003230941, has motivated the recent appearance of proposals for horizontal-type automatic packaging machines that make use of this technology for the conveyor devices that procure the transport of pouches along the processing units.

Because active and reactive elements are associated with the track and with each of the movers, advantageously, each mover can be individually controlled for its movement along the track, what makes the packaging machines more versatile.

Both patent documents WO 2014207278 A1 and US2022315356 disclose an horizontal-type automatic packaging machine with a conveyor device for conveying pouches along successive processing units using a controlled motion system of the type of that disclosed in the cited document US2003230941, wherein clamps associated to pairs of movers grip a pouch at opposite side edges thereof with the pouch adopting a vertical position. Because the movers, and therefore, their associated clamps, can be individually driven, the automatic packaging machine can handle pouches of different format, especially, pouches with different dimensions in width.

However, pouches of different formats may require different operations for filling and sealing; they may require further operations; they may be intended to be filled with different products; and/or, in any case, they may require different steps that in turn may need different machine configurations, that is, to provide the machine with different processing units, according to the particularities not only of each pouch format, but also of each recipe of the manufacturing batch or batches.

In general, pouches of different format are also considered when they differ in having or not a spout for the output of the product with which the pouches will be filled. One can find in the market pouches with central spouts or with corner spouts, to name some.

The patent document DE102006045292 describes a packaging machine comprising processing units as separate modules, having respective drives which can be operated independently of one another, and at least two processing units having servomotors as drives which are designed to be operated synchronously by means of a controller. In this case, each processing unit, as a separate module, includes its own container conveying means.

The patent document EP 3261938 describes a packaging machine comprising a plurality of mobile processing units at adjustable interdistances, designed for performing, in succession, operations of welding, forming and processing of pouches in the form of envelopes, each processing unit having a substantially vertically-arranged frame slidably positioned on fixed guide rails. This allows the control and the management of the relative and absolute positioning of the processing units along a working line on which they have freedom of movement by means of recirculating ball screw runners. EP 3261938 focuses on controlling and varying the position of the processing units in order to adapt to pouches with different dimensions in width, instead of controlling and varying the stopping position of the transported pouches with respect to the processing units when there is a change in the dimensions of the pouches.

Similarly, patent document WO 03082679 describes a packaging machine wherein individual work stations are movably attached to longitudinal elements joined to the frame of the machine.

The patent document EP 2942547 discloses a similar automatic format-changing device for an automatic packaging machine with means for forming and filling containers.

The patent document WO 2018024365 describes a packaging machine for producing packaging of tobacco products having control cabinets each containing the electrical/electronic equipment required for the operation of a respective production unit.

An objective of the present invention is to provide an alternative to the already known horizontal-type automatic packaging machines.

It is also an objective of the present invention a solution to shorten the production and commissioning of such machines; to adapt them flexibly to the requirements of the respective intended application; without renouncing to the fact that the machines can operate on different pouch formats (or requiring different operations-such filling them with different products or volume) in a same row, that is, when the succession of pouches that are transported along the processing units includes containers of different formats.

DESCRIPTION OF THE INVENTION

With the aim of finding an alternative to the known packing machines and to overcome the above-mentioned drawbacks, a packaging machine according to claim 1 is disclosed.

The packaging machine comprises a track defining a closed path; a number of carriage assemblies moveable along the track; a main controller in electrical communication with the track and the carriage assemblies for the independent but coordinated movement of the carriage assemblies, the said carriage assemblies being configured to grip a pouch so that, each carriage assembly, or cooperatively a number of successive carriage assemblies, is able to hold in a suspended fashion a flexible pouch and to convey it along at least a section of the track; a series of processing modules moveably engaged with a common supporting rail, the processing modules having configurable tools able to perform an operation on the conveyed pouches; and a corresponding series of control units, each control unit to control the configurable tools of a processing module or the configurable tools of a set of functionally-related processing modules, the control units being moveably engageable in a static frame to which the supporting rail of the processing modules is also solidly joined to.

Advantageously, control units can be replaced, added or removed, simply disconnecting and/or connecting them from the main controller 3, directly or indirectly. The same applies to the physical means that operate on the pouches, grouped in processing modules, moveably engaged with a common supporting rail. Further, as it will be explained below, control units may arranged above and vertically aligned with the processing module or modules whose configurable tools they control, facilitating and simplifying the connections and wiring length between the control units and the processing modules.

Control units, some, or all of them, can have each at least two connecting ports to operatively connect them in series and to connect one of the control units connected in series to the main controller.

In an embodiment, control units, some, or all of them, are adapted to operatively connect them in series and to connect one of the control units connected in series to the main controller following a daisy chain wiring scheme.

In one embodiment, connecting ports of various of the control units, that can be all of them, are identical.

In an embodiment, the main controller is able to store instructions transmitted to the processing modules, via their associated control units, the instructions including orders to automatically reconfigure or to differently operate their tools.

For example, the instructions can obey to a batch recipe following a repeating pattern. The repeating pattern may comprise the alternation of pouches of different format and/or requiring different needs and the control units will then command the tools of the associated processing modules to automatically change their operation or mode of operation accordingly.

In an embodiment, an electronic identification is assigned to each carriage assembly; and the main controller is able to generate instructions transmitted to the processing modules, via their associated control units, to automatically configurate or operate their tools as a function of the electronic identification of the carriage assembly, or carriage assemblies, passing through the processing modules.

For example, the packaging machine may be equipped with means to detect a pouch format, the main controller can store tool instructions for the specific detected pouch format and associate this instructions with the carriage assembly or carriage assemblies conveying the pouch.

An instruction may be to not perform any action.

According to a constructive solution, the packaging machine comprises two supporting rails each arranged parallel to a straight section of the track; each supporting rail being dimensioned to receive the engagement of a plural number of processing modules, lined up along the common supporting rail.

In an embodiment, at least a supporting rail comprises a set of at least two parallel bars arranged at a same side of the track, each having a rounded or circular cross-section.

In an embodiment, the track is arranged at a horizontal reference plane and a supporting rail, preferably all of them, are arranged at a level above the horizontal reference plane.

In an embodiment, the static frame comprises removably connected sub-frames dimensioned so as to receive the moveably engagement of a plural number of control units, preferably arranged above the level of the processing modules.

In an embodiment, control units are arranged above and vertically aligned with the processing module or modules whose configurable tools they control.

In an embodiment, the track determines a closed path in the form of an oblong trajectory seen from above, comprising two straight long and parallel sections finding symmetry with respect to a longitudinal axis of the track; and the packaging machine has two long supporting rails arranged each parallel to a long straight section of the track; each long supporting rail receiving the engagement of a plural number of processing modules.

DETAILED DESCRIPTION OF THE INVENTION

Figures 1A, 1B, 1C:
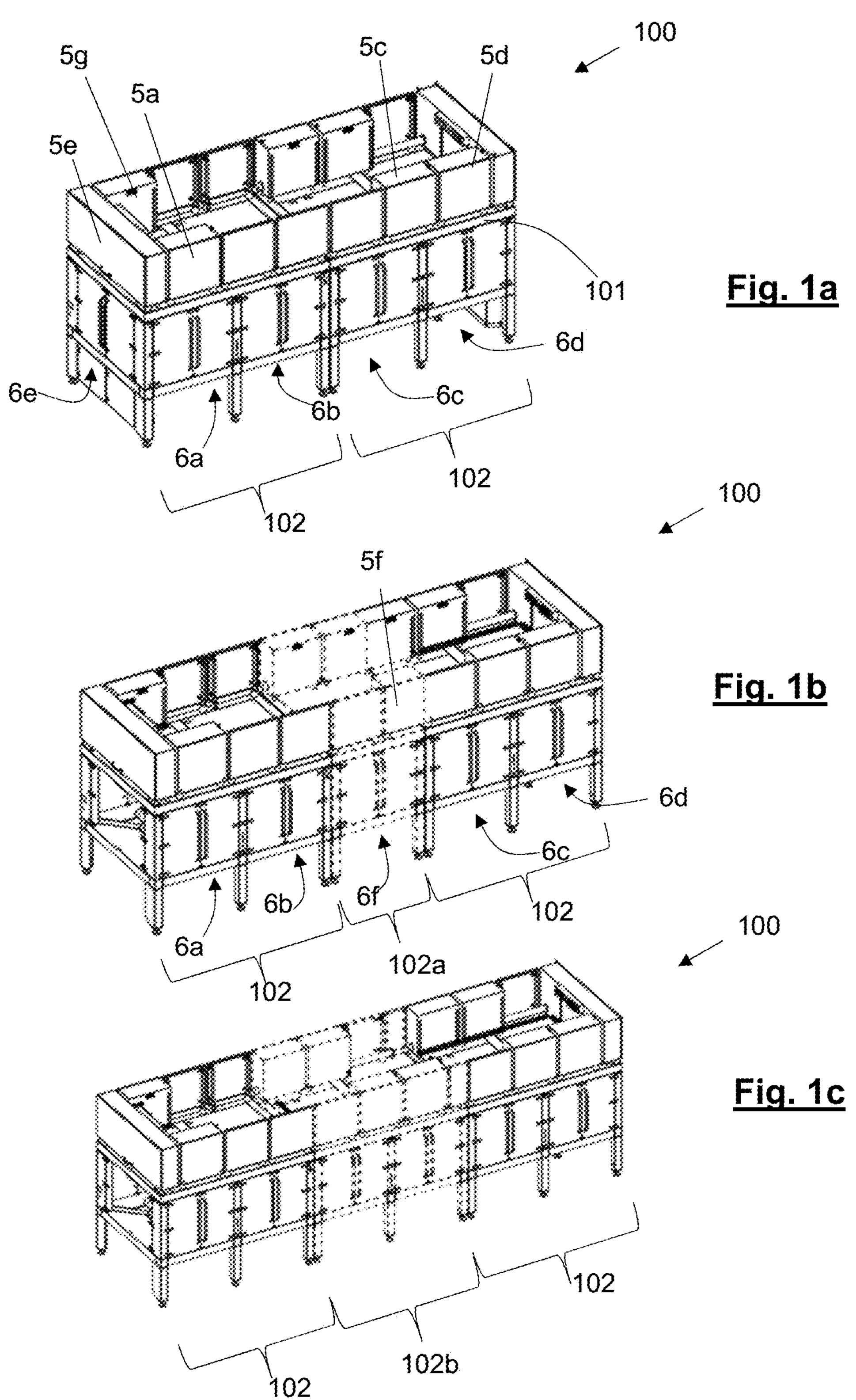
FIGS. 1*a* to 1*c* show respective assembly options for a packaging machine according to the invention.

FIGS. 1*a* to 1*c* exemplify respective assembly options of a packaging machine 100 according to the invention, as a mere example. The packaging machine can carry out several operations on pouches, for instance, filling the pouches, partially sealing, providing them with a spout at a corner thereof, etc.

In packaging machine 100, there are tools destined to operate on the pouches, although said tools are grouped in processing modules, physically separated but removably assembled or linked to a same mechanical structure.

In FIGS. 1*a*-1*c*, the processing modules are hidden by pairs of doors. Behind a pair of doors there may be one or more processing modules, depending on the size of the tools to perform the corresponding operations of each processing module.

The means that govern the processing modules are grouped in control units. A main controller coordinates the control units.

The said mechanical structure also supports a track 1 (see FIG. 2), defining a closed path along which a number of carriage assemblies (not reproduced in the figures) are moveable. The closed path includes oval and rounded corners connecting, for example, four straight sections.

In a known way, the main controller is in electrical communication with the track 1 and the carriage assemblies for the coordinated movement of the carriage assemblies, preferably through dedicated track section controllers 4*a*, 4*b*, as will be later presented, for example in FIG. 5*a*.

A carriage assembly may be configured to grip and convey a pouch so that the carriage assembly is able to hold in a suspended fashion a flexible pouch and to convey it along at least a section of the track 1. For example, a carriage assembly can be provided with a pair of clamps configured to grip a pouch at opposite side edges thereof with the pouch adopting a vertical position; or a carriage assembly can be provided with a single clamp configured to properly grip a pouch with the pouch adopting a vertical position.

A carriage assembly may be configured to cooperate with another carriage assembly to jointly grip and convey a pouch so that they are able to hold in a suspended fashion a flexible pouch and to convey it along at least a section of the track 1. For example, two consecutive carriage assemblies moving on the track 1 can be provided each with a clamp, the set of clamps configured to grip a pouch at opposite side edges thereof with the pouch adopting a vertical position.

It is conceived to have carriage assemblies of a different type moving on the track 1, this is, to combine carriage assemblies configured to grip a pouch with pairs of carriage assemblies, the carriage assemblies of a pair cooperating to grip a pouch.

Regarding the processing modules, there will be some which have configurable tools able to perform an operation, or various operations, on the conveyed pouches.

“Configurable” means that they can be commanded to operate differently without being replaced. For example, a valve can be actuated or not to be actuated, can be actuated to be opened or closed in a different grade, can be operated following different time regimes, etc.; a welding jaw can be actuated or not to be actuated, can be actuated to exert more or less press on a pouch, can be operated providing more or less heat, etc.

Regarding the control units, it is envisaged to have a control unit to control the configurable tools of an associated processing module or the configurable tools of a set of functionally-related processing modules. For example, there can be a number N of processing modules and a corresponding N control units. For example, there can be a number N of processing modules and n control units, where N>n.

Regarding the mechanical structure, it comprises a static frame 101 (see FIGS. 2-3) to which the track 1 is solidly fixed.

In an embodiment, the static frame 101 is completed with removably connected sub-frames 102, 102*a*, 102*b* dimensioned so as to receive the moveably engagement of at least one control unit and to house at least an associated module whose configurable tools are controlled by the said at least one control unit.

Figures 2, 3:
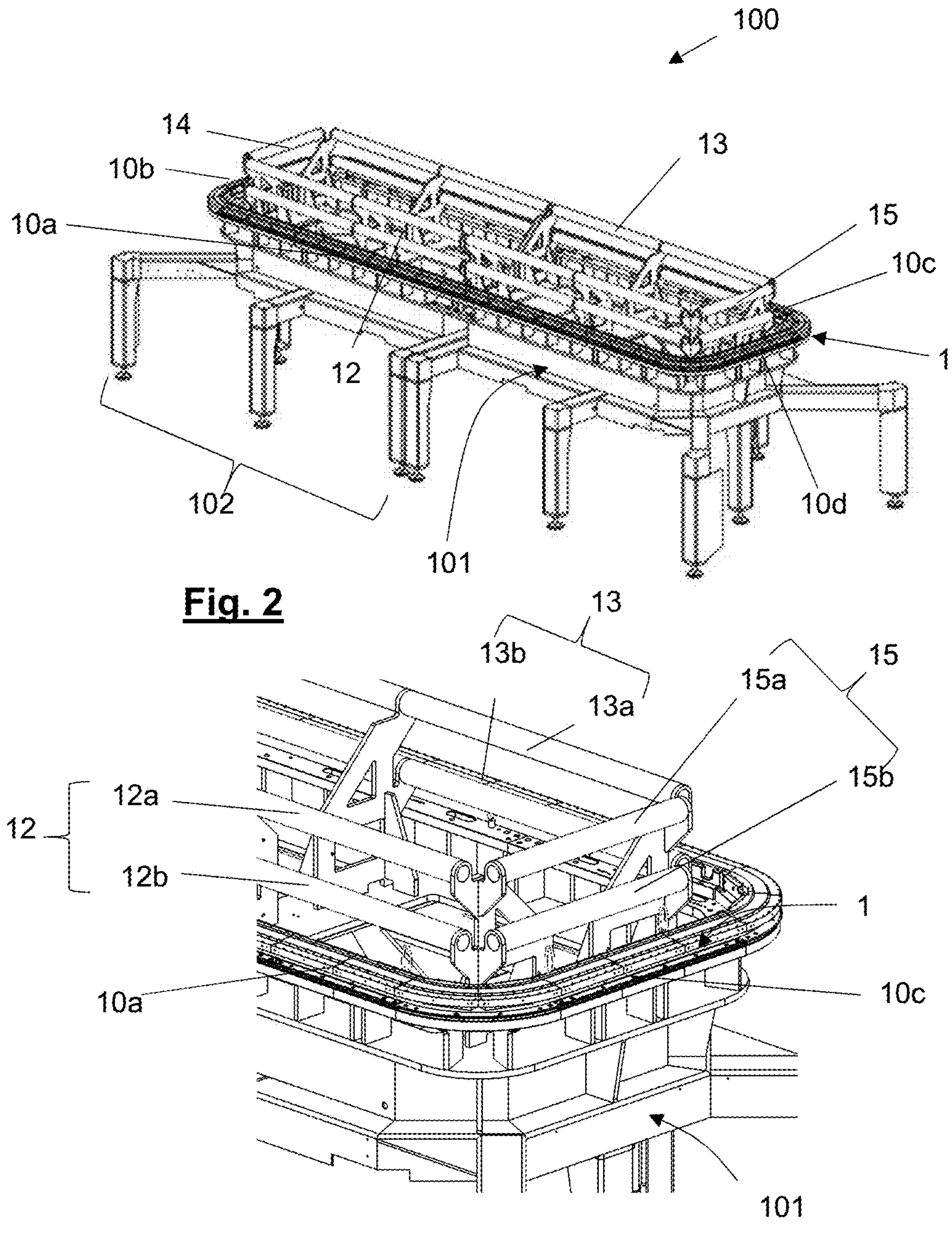
FIG. 2, shows a packaging machine according to the invention, expressly devoid of processing units to be able to visualize a constructive order that would otherwise be hidden.
FIG. 3, shows a detailed view of a part of a packaging machine according to the invention, expressly devoid of processing units to be able to visualize a constructive order that would otherwise be hidden.
Figure 4:
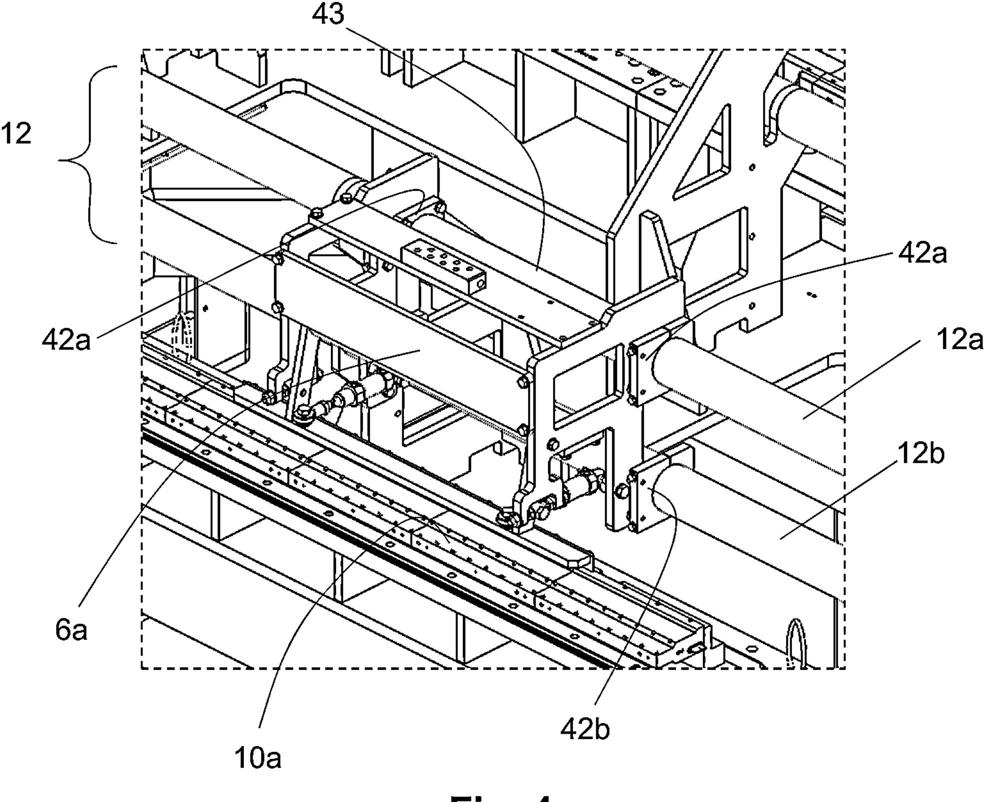
FIG. 4, shows a detailed view of another part of a packaging machine according to the invention, in this case with a structure of a processing unit properly engaged thereto, expressly devoid of its possible configurable tools to be able to visualize a constructive order that otherwise would be hidden.

This particular arrangement and its advantages will be best understood from the following examples, in support of FIGS. 2-4.

In FIG. 2, the track 1 determines a closed path in the form of an oblong trajectory seen from above, comprising two straight long and parallel sections 10*a*, 10*c*, and two straight short and parallel sections 10*b*, 10*d*, the long and the short sections being connected by curved sections, defining a sort of rectangle with rounded vertices finding symmetry with respect to a longitudinal axis. Naturally, the invention envisages other possibilities.

In these FIGS. 2-4, the track 1 is inscribed on a horizontal plane.

In other embodiments of the invention which are not represented, the track 1 can have sections with slopes that can make the track 1 is not entirely inscribed in a horizontal plane.

Figure 8:
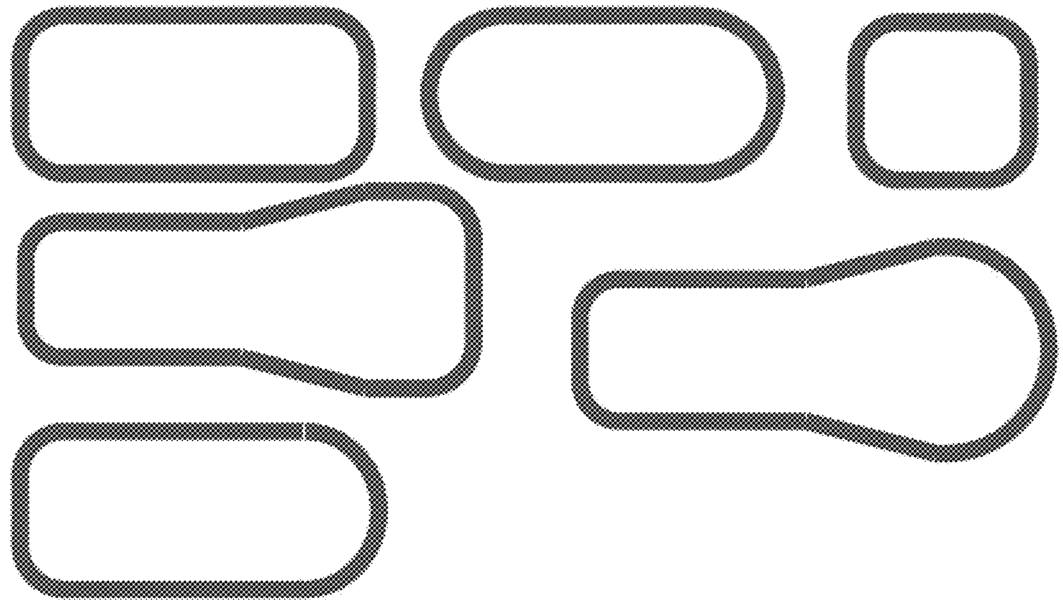
FIG. 8, shows alternative shapes or forms for a track of a machine according to the invention.

Although in the FIGS. 2-4 the track 1 is in the form of an oblong trajectory seen from above other forms are conceived. These forms can preferably alternate straight sections with curved sections. The grouping of tools in processing modules removably assembled or linked to a same mechanical structure and the added grouping also of the means that govern the processing modules in control units makes possible the adaptability and organization of these means around the track even if it does not have a simple form. In this sense, FIG. 8 illustrates possible alternatives to that shoed in the specific examples of FIGS. 2-5.

In the FIGS. 1*a*-1*c* and FIGS. 2-4, the distance separating the long straight sections 10*a*, 10*c* of the track 1 allows an operator to be located there, for example, to attend maintenance or repair needs.

Taking advantage of the fact that the track 1 is not a single piece and that it is formed by the concatenation of sections 10*a*, 10*b*, 10*c*, 10*d*, the packaging machine 100 can be adapted to the needs that are required in each case.

FIG. 1*a* responds to a version of a simple packaging machine 100, with a mechanical structure comprising of the serial connection of two sub-frames 102.

In FIG. 1*b*, a middle sub-frame 102*a* has been added between the two sub-frames 102 of the packaging machine 100 of FIG. 1*a*, whilst in FIG. 1*c*, a longer sub-frame 102*b*, in comparison to the sub-frame 102*a*, has been added between the two sub-frames 102 of the packaging machine 100 of FIG. 1*a*. The sub-frame 102*b* is twice longer than sub-frame 102*a* and the subframes 102 are the longest ones.

In the examples of FIGS. 1*a* to 1*c*, the sub-frames 102, 102*a* and 102*b* share a dimension in width, that is, in the transverse direction to the straight sections of the track 1, sufficient to encompass the track 1. However, different lengths and widths of the sub-frames are possible, depending on the size of the processing modules each sub-frame houses.

According to one embodiment of the packaging machine, along one of the long straight sections 10*a* of the track 1, a first sub-frame is dimensioned in length to house a first processing module. A first processing module can be that carrying out the filling operations of the pouch or pouches that stop in its workspace. A second sub-frame is sized to house a second processing module. A second processing module can be that carrying out the sealing operations of the pouch or pouches, previously filled, that stop in its workspace. Analogously, along the other of the long straight sections 10*c* of the track 1, the first and the second sub-frames are dimensioned in length to house further respective processing modules.

Alternatively, as in the case of the packaging machine 100 of FIG. 1*a*, along one of the long straight sections 10*a* of the track 1, a first sub-frame 102 is dimensioned in length to house the processing modules 6*a* and 6*b*, and a second sub-frame 102 houses the processing modules 6*c* and 6*d*. Along the other long straight long section 10*c* of the track 1, a processing module 6*g* whose tools are controlled by a control unit 5*g*, is housed in the first sub-frame 102.

In the packaging machine 100 of FIG. 1*b*, along one of the long straight sections 10*a* of the track 1, the intermediate sub-frame 102*a* has been placed between the first and second sub-frames 102 to house a processing module 6*f* in order to perform a certain operation on the pouches coming from the processing module 6*b* and before performing the operation corresponding to the processing module 6*c*, or in order to perform a certain operation only on some of the pouches with a specific format coming from the processing module 6*b*.

It is a characteristic aspect though of the packaging machine 100 that several processing modules are moveably engaged with a common supporting rail, wherein the said supporting rail is fixed the static frame to which the track 1 is also fixed.

In the embodiments of FIGS. 2-4, the packaging machine 100 has two long supporting rails 12, 13 arranged each parallel to a long straight section 10*a*, 10*c* of the track 1; each long supporting rail 12, 13 being dimensioned to receive the engagement of a plural number of processing modules, lined up along the common long supporting rail 12, 13.

In the embodiments depicted in FIGS. 2-4, the packaging machine 100 has also two short supporting rails 14, 15 arranged each parallel to a short straight section 10*b*, 10*d* of the track. Each supporting rail 14, 15 is dimensioned to receive the engagement of one or more processing modules.

Translated these teachings to the example of FIGS. 1*a* and 2, the processing modules 6*a* to 6*d* are coupled to the same supporting rail 12, in the specific case sized according to the length of the front straight section 10*a* of the track 1. Thus, the said processing modules are not directly supported in the sub-frames housing them but to the common supporting rail 12 passing through the sub-frames.

FIGS. 2 and 3 illustrate, by way of a non-limitative example, an embodiment wherein each supporting rail 12, 13, 14, 15 comprises a set of at least two parallel bars, specifically an upper and a lower bar 12*a*, 12*b*; 13*a*, 13*b*; 14*a*, 14*b*; 15*a*, 15*b*, arranged at a same side of the associated straight section 10*a*, 10*c*, 10*b*, 10*d* of the track 1, the upper and the lower bars having a rounded or circular cross-section, devoid of angles, corners or other protrusions that can favor the accumulation of dirt.

In this example, the upper and the lower bars 12*a*, 12*b*; 13*a*, 13*b*; 14*a*, 14*b*; 15*a*, 15*b* are contained in a same vertical plane. In other embodiments, the upper and the lower bars 12*a*, 12*b*; 13*a*, 13*b*; 14*a*, 14*b*; 15*a*, 15*b* can be horizontally out of phase. In other examples, there may be more than two bars.

FIG. 4 illustrates how to clamp a processing module 6*a* to the set of upper and lower bars 12*a* and 12*b* of a common supporting rail 12.

In this specific example, a processing module 6*a* (illustrated devoid of tools) comprises a supporting structure with two respective joining flanges 42*a*; 42*b* dimensioned to encircle and to tighten a bar 12*a*; 12*b*. Each flange 42*a*; 42*b* may have a sleeve 43, in contact with the bar 12*a*; 12*b*, made of a material that facilitates the sliding of the flange along the corresponding bar 12*a*, 12*b*, so that loosening the flange 42 and without removing it, the processing module 6*a* can slide to make a fine adjustment of its position along the set of bars 12*a*, 12*b*.

Figure 9:
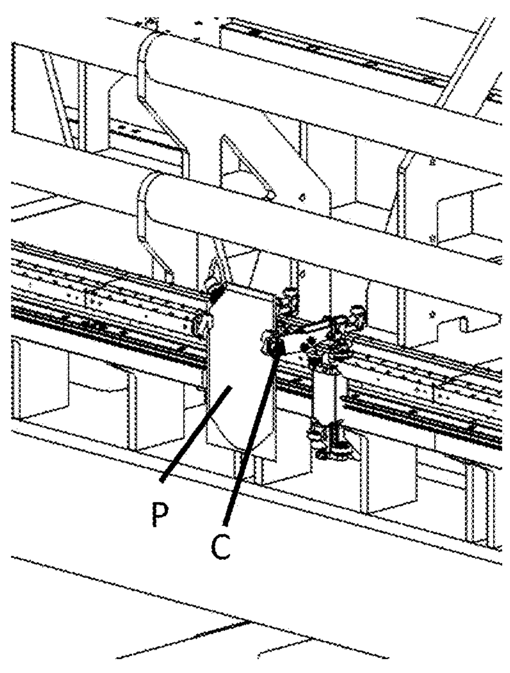
FIG. 9 shows an example of a clamp C configured to grip a pouch at opposite side edges thereof with the pouch adopting a vertical position.
Figure 10:
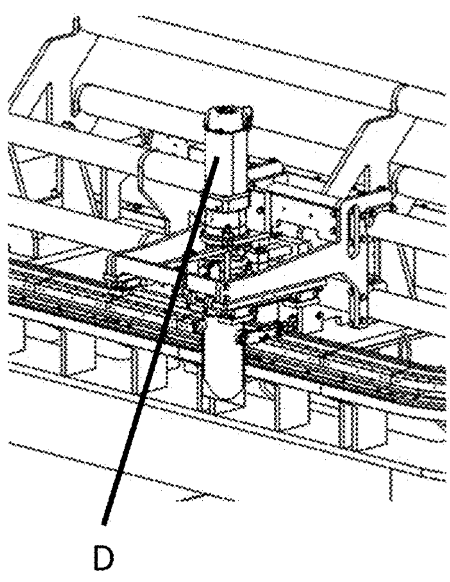
FIG. 10 shows an example of a tool D above a pouch.

FIG. 9 shows an example of a clamp C configured to grip a pouch at opposite side edges thereof with the pouch adopting a vertical position. FIG. 10 shows an example of a tool D above a pouch.

Preferably, the bars 12*a*, 12*b* are made of stainless steel.

Also preferably, the sleeve 43 is a separate piece of the flange 42*a*; 42*b*. Preferably, the sleeve 43 is not made of metallic material. The sleeve 43 can be made of plastic material.

Turning back to the examples of FIGS. 1*a* to 1*c*, the FIG. 1*b* responds to a version of a more complete packaging machine 100, for example prepared to handle pouches with spouts, with a mechanical structure comprising of the serial connection of three sub-frames: one central sub-frame 102*a* and two end sub-frames 102. The provision of a further sub-frame 102*a* in the elongated long section 10*a* of the track 1 compared to the packaging machine 100 of the FIG. 1*a* makes possible the housing and the coupling of a further processing module 6*f* to the same long supporting rail 12 to which the processing modules 6*a* to 6*d* are also supported. For this specific example, the processing module 6*f* can carry out the supplying and the attachment of the spouts to the pouch or pouches in need thereof that stop in its workspace.

Indeed, as it will be explained later, the packaging machine 100 will be able to operate on pouches of different formats or on pouches that require different needs or that must be operated following a different recipe. Therefore, it may be that, by way of example only, the processing module 6*f* that can procure the supply of spouts and their attachment to the pouch or pouches that circulate through it does not operate on said pouches, for example, if it is not required to provide them with a spout.

The FIG. 1*c* could respond to a further version of an even more complete packaging machine 100, prepared to handle pouches requiring more operations or to improve the productivity by doubling or triplicating some of the proceeding modules or doubling or triplicating some of the configurable tools of one or more of the processing modules. In the specific example of FIG. 1*c*, the mechanical subframe comprises of the serial connection of three sub-frames: one central sub-frame 102*b*, that is longer than sub-frame 102*a* of FIG. 1*b*, and two end sub-frames 102.

The examples of FIGS. 1*b* and *c* also serve to illustrate that not all the sub-frames 102, 102*a*, 102*b* must have the same dimensions.

Figure 5:
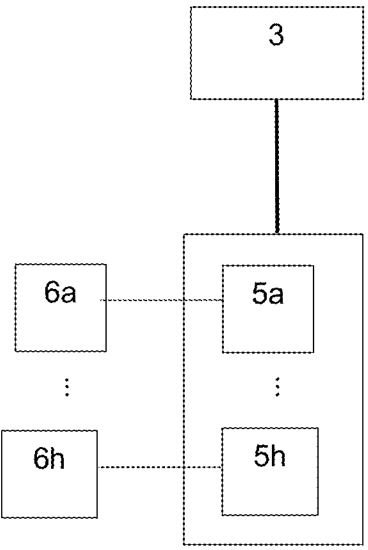
FIG. 5, shows a general assembly scheme, as regards the connections to command the packaging machine.

FIG. 5 shows a general connection diagram of the main controller 3, which is also connected and controls the track section controllers, and the control units 5*a* to 5*h*, so the control units 5*a* to 5*h* can receive commands through a data link from the main controller 3, or from a proxy 3' connected to the main controller 3.

The control units 5*a* to 5*h* are connected to corresponding processing modules 6*a* to 6*h*, so the control units 5*a* to 5*h* can execute the commands received though a data link, for example a data network link, from the main controller 3 using their connected processing modules 6*a* to 6*h*. Since an electronic identification can be assigned to each carriage assembly, the main controller can generate instructions to be transmitted to the processing modules 6*a* to 6*h*, via their associated control units 5*a* to 5*h*, to automatically configurate or operate their tools as a function of the electronic identification of the carriage assembly, or carriage assemblies, passing through the processing modules, so different operations can be executed depending on the pouch being transported by the carriage assembly, effectively providing the capability to work on different pouches in a row. An instruction can be not to perform any action, for example because the carriage assembly transports a pouch that is not to be processed by certain processing module 6*a* to 6*h*.

Naturally, several network connection arrangements between the main controller 3 and the track section controller and from the main controller 3 and the control units 6*a* to 6*h* are possible, being also possible that data and power lines being wired together. Advantageously, control units 5*a* to 5*h* can be replaced, added or removed, simply disconnecting and/or connecting them from the main controller 3, directly or indirectly. Naturally, combinations of serial and parallel connections of the control units 5*a* to 5*h* to the main controller 3 and optionally to the main power supply are envisaged, forming, for example a daisy chain, bus or star wiring scheme, among others. It is envisaged that the connecting ports of at least part of the control units are identical, so an easy plug and play system is used where a control unit can be easily replaced, added or removed.

Figure 5A:
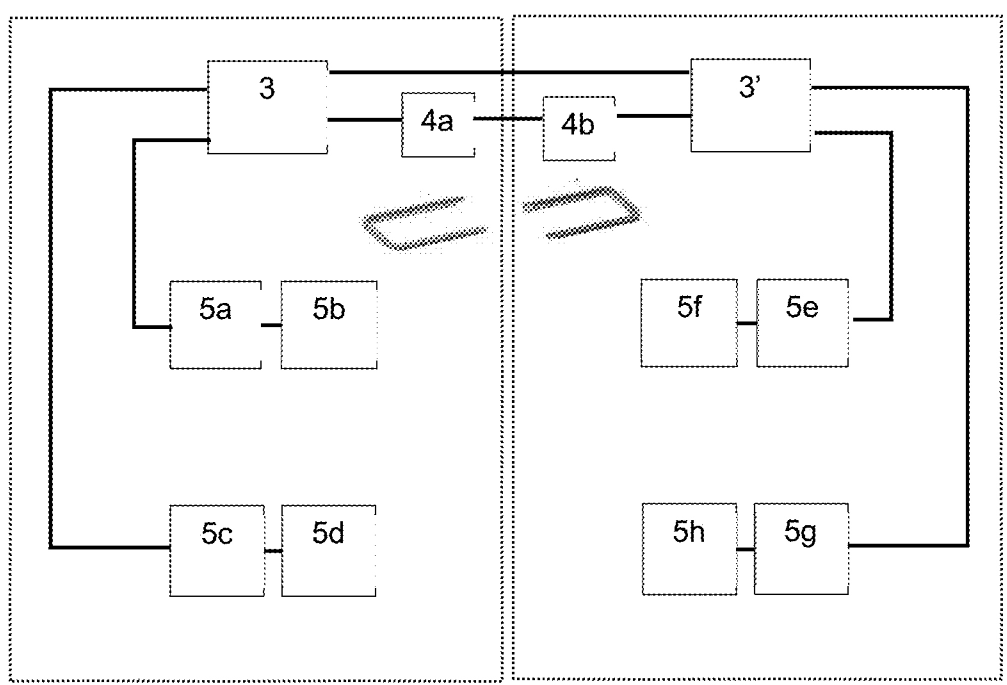
FIG. 5*a* shows an assembly scheme of an embodiment to the packaging machine.

FIG. 5*a* shows one embodiment in which both power and data lines are serially connected from the main controller 3 forming a daisy chain wiring scheme.

The processing modules controlled by the control units 5*a* to 5*h* are not displayed. All data and power lines can be bundled in a single cable, so only one input and one output connector are provided in each control unit 5*a* to 5*h* to which the cable connects, so data and power passes through the different control units 5*a* to 5*h*.

In FIG. 5*a* the control units 5*a* to 5*h* are represented in the same way as neighboring in the track 1. As it can be seen, in this embodiment, the track is divided in two parts (transversally divided) corresponding to both sides of the track, the track being prepared to be enlarged or cut to modify the number of processing modules to be installed. As it can be seen, in the represented embodiment each side of the track has two branches for connecting to each part of the side of the track, one of the sides comprising a proxy 3' for relaying commands sent by the main controller 3 to their respective two branches for obtaining a more distributed and modular network.

Figure 5B:
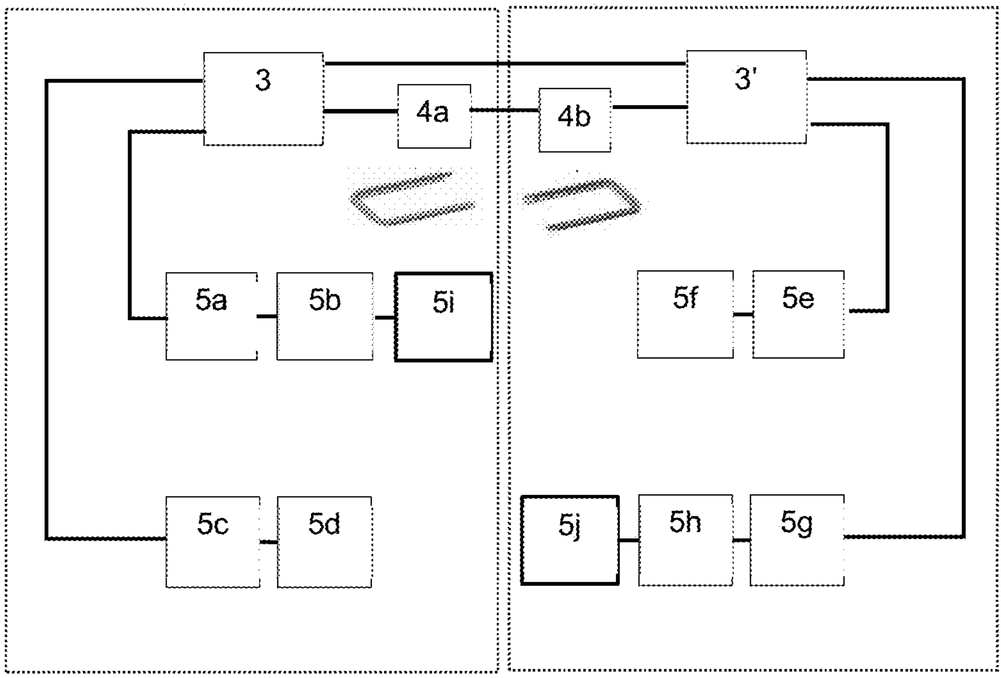
FIG. 5*b* shows an assembly scheme of the addition of two control units in the embodiment of FIG. 5*a;*

FIG. 5*b* represents the addition of two new control units 5*i*, 5*j* in the packaging machine 100 which will be associated and connected to respective added processing modules, not shown. The new control units 5*i*, 5*j* are connected in series to their respective adjacent control units 5*b*, 5*h*. As previously explained, the track 1 and the packaging machine 100 are extended to accommodate the new processing modules and associated control units 5*i*, 5*j*. Advantageously, the new control units 5*i*, 5*j* do not require rewiring the whole packaging machine 100, as simply plugging the new control units 5*i*, 5*j* to their neighboring control units 5*b*, 5*h* allows the new control units 5*i*, 5*j* to be connected to the data link of the main controller 3 and to the power link. Additional control units can be further placed by connecting in chain the additional control units.

Figure 5C:
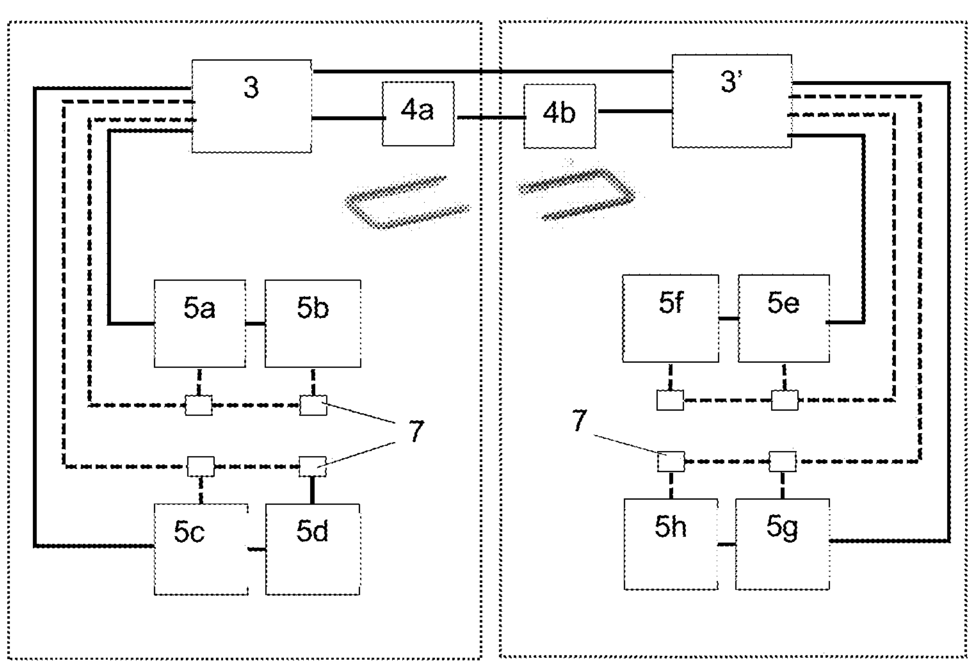
FIG. 5*c* shows an assembly scheme of another embodiment to the packaging machine.

FIG. 5*c* represents another embodiment in which the power link and the data link are separated, thus not being distributed in a bundled cable. Although this arrangement requires more wiring, it can be advantageous in packaging machines 100 where the power link causes interferences to the data link. Therefore, keeping them separated improves the integrity of the data being transferred through the data link. In this embodiment, each control unit 5*a* to 5*h* is further presented with a power socket 7 to which the control unit 5*a* to 5*h* is connected.

Figure 5D:
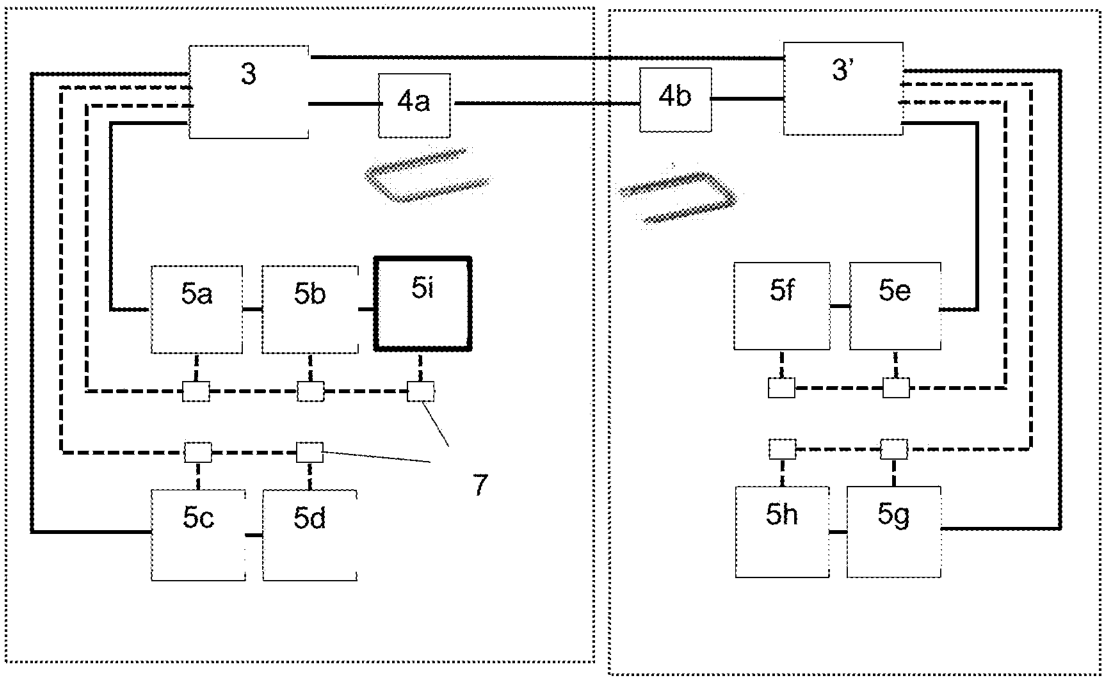
FIG. 5*d* shows an assembly scheme of the addition of one control unit in the embodiment of FIG. 5*c;*

As it can be seen in FIG. 5*d*, in this case, adding a new control unit 5*i*, not only requires connecting to the neighboring control unit 5*b*, also powering the new control unit 5*i* by connecting the control unit 5*i* to a new provided power socket 7.

Naturally, although not represented, the main controller 3 could be connected to the control units 5*a* to 5*h* in a star wiring scheme, where a point-to-point connection between the main controller 3, or a proxy 3', and control units 5*a* to 5*h* is used. This wiring scheme could be advantageously for avoiding loss of the data link signal when traversing each of the control units, in a bus or daisy chain wiring scheme, although more wires are required. In this case, control units can also be added, removed or replaced, since they could be sized to be replaceable, for example for having the same size, but new wires would be necessary.

Figure 6:
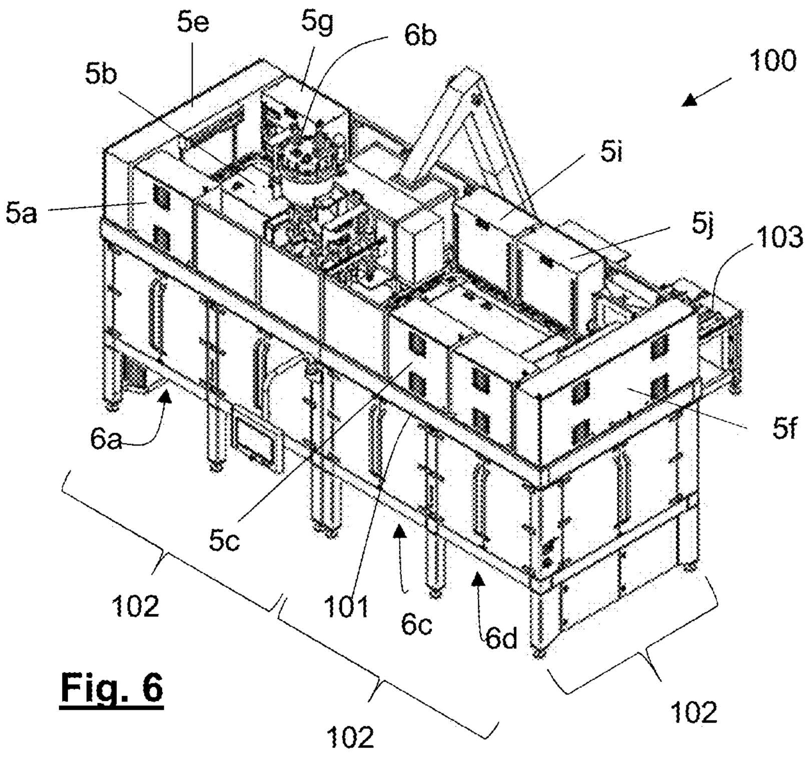
FIG. 6, shows in a perspective view a machine according to the invention, complete.
Figure 7:
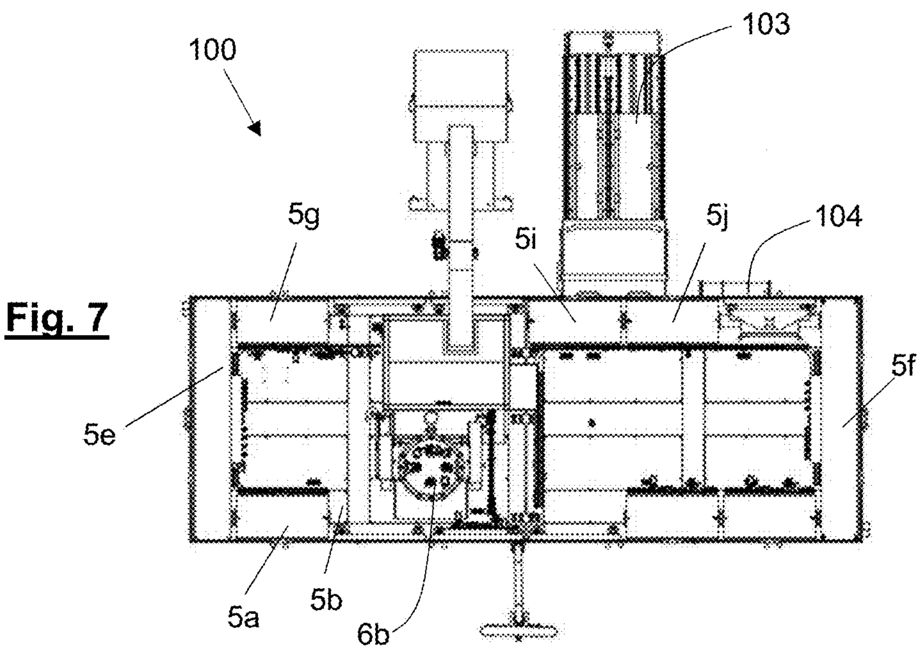
FIG. 7 shows a top view of the machine of FIG. 6.

FIGS. 6 and 7 show a perspective view and a top view of another embodiment of a packaging machine 100 according to the invention.

The packaging machine 100 is fully equipped and ready to operate. The example shows a possible location of the control units 5*a*, 5*b*, 5*c*, 5*d*, 5*e*, 5*f* in the packaging machine 100. Specifically, one advantageous location is that in which the control units 5*a*, 5*b*, 5*c*, 5*d*, 5*e*, 5*f* are arranged vertically aligned with the processing module or processing modules 6*a*, 6*b*, 6*c*; 6*d*, 6*e*, 6*f* whose configurable tools they control. In the specific example, the control units are disposed above their associated processing module or modules. This arrangement facilitates and simplifies the connections and wiring length between the control units 5*a*, 5*b*, 5*c*, 5*d*, 5*e*, 5*f* and the processing modules 6*a*, 6*b*, 6*c*; 6*d*, 6*e*, 6*f*; and does not hinder operator access to the interior of the track.

In the specific example, seen from above, the physical spatial arrangement of the control units is around the perimeter of the packaging machine 100.

Also advantageously, because the constructive logic of the packaging machine is specially designed so that it can be lengthened or shortened, depending on the need for processing modules, the modularity explained above with regard to the control units also allows to follow a logic of connection between control units 5*a* to 5*f* and the main controller 3 regarding the data and electrical connections. Therefore, a processing module and control unit can be added, after lengthening the machine, or removed and thus shortening the machine. Since processing modules and control units are connected to each other, the control unit can effectively control their associated processing module or modules.

The invention claimed is:

1. A packaging machine, comprising:

a static frame;

a track defining a closed path;

a number of carriage assemblies directly supported by and moveable along the track;

a main controller in electrical communication with the track and the carriage assemblies for the independent but coordinated movement of the carriage assemblies, the carriage assemblies being configured to grip a pouch so that, each carriage assembly, or cooperatively a number of successive carriage assemblies, is able to hold in a suspended fashion a pouch and to convey the pouch along at least a section of the track;

a series of processing modules directly supported by and moveably engaged with a common supporting rail, the processing modules having configurable tools able to perform an operation on the conveyed pouches;

a corresponding series of control units, each control unit to control the configurable tools of a processing module or the configurable tools of a set of functionally-related processing modules, the control units being moveably engageable in the static frame; and wherein the track and the supporting rail are mounted to the static frame, with the track disposed below the supporting rail.

2. The packaging machine according to the claim 1, wherein the control units have each at least two connecting ports to operatively connect them in series and to connect one of the control units in series to the main controller.

3. The packaging machine according to claim 2, wherein control units are adapted to operatively connect them in series and to connect one of the control units connected in series to the main controller following a daisy chain wiring scheme.

4. The packaging machine according to according to claim 1, wherein connecting ports of various of the control units are identical.

5. The packaging machine according to claim 1, wherein the main controller is able to store instructions transmitted to the processing modules, via their associated control units, the instructions including orders to automatically reconfigure or to differently operate their tools.

6. The packaging machine according to claim 1, wherein an electronic identification is assigned to each carriage assembly; and wherein the main controller is able to generate instructions transmitted to the processing modules, via their associated control units, to automatically configurate or operate their tools as a function of the electronic identification of the carriage assembly, or carriage assemblies, passing through the processing modules.

7. The packaging machine according to claim 5, wherein an instruction is to not perform any action.

8. The packaging machine according to claim 1, comprising two supporting rails each arranged parallel to a straight section of the track; each supporting rail being dimensioned to receive the engagement of a plural number of processing modules, lined up along the common supporting rail.

9. The packaging machine according to claim 8, wherein a supporting rail comprises a set of at least two parallel bars arranged at a same side of the track, each having a rounded or circular cross-section.

10. The packaging machine according to claim 1, wherein the track is arranged at a horizontal reference plane and wherein a supporting rail is arranged at a level above the horizontal reference plane.

11. The packaging machine according to claim 1, wherein the static frame comprises removably connected sub-frames dimensioned so as to receive the moveably engagement of a plural number of control units.

12. The packaging machine according to claim 1, wherein a control unit is arranged above and vertically aligned with a processing module whose configurable tools control.

13. The packaging machine according to claim 1, wherein the track determines a closed path comprising two straight long sections; and in that the packaging machine has two long supporting rails arranged each parallel to a long straight section of the track; each long supporting rail receiving the engagement of a plural number of processing modules.

14. The packaging machine according to claim 13, wherein the two straight long section find symmetry with respect to a longitudinal axis of the track.

15. A packaging machine, comprising:

a static frame;

a track defining a closed path directly supporting and configured to guide a number of carriage assemblies moveable along the track;

a main controller in electrical communication with the track and the carriage assemblies for the independent but coordinated movement of the carriage assemblies, the carriage assemblies being configured to grip a pouch so that, each carriage assembly, or cooperatively a number of successive carriage assemblies, is able to hold in a suspended fashion a pouch and to convey it along at least a section of the track;

a series of processing modules directly supported by and moveably engaged with a common supporting rail, the processing modules having configurable tools able to perform an operation on the conveyed pouches;

a corresponding series of control units, each control unit to control the configurable tools of a processing module or the configurable tools of a set of functionally-related processing modules, the control units being moveably engageable in the static frame;

wherein the track and the supporting rail are mounted to the static frame, with the track disposed below the supporting rail.

16. The packaging machine according to claim 15, comprising two supporting rails each arranged parallel to a straight section of the track; each supporting rail being dimensioned to receive the engagement of a plural number of processing modules, lined up along the common supporting rail.

17. The packaging machine according to claim 15, wherein the track determines a closed path comprising two straight long sections; and in that the packaging machine has two long supporting rails arranged each parallel to a long straight section of the track; each long supporting rail receiving the engagement of a plural number of processing modules.

18. A packaging machine, comprising:

carriage assemblies;

track means for moveably supporting the carriage assemblies;

a main controller in electrical communication with the track means and the carriage assemblies for the independent but coordinated movement of the carriage assemblies, the carriage assemblies configured to grip a pouch so that, each carriage assembly, or cooperatively a number of successive carriage assemblies, and to hold in a suspended fashion a pouch and to convey the pouch along at least a section of the track means;

processing modules;

supporting rail means for engaging and moving the processing modules, the processing modules having configurable tools to perform an operation on the conveyed pouch;

a corresponding series of control units, each control unit to control the configurable tools of a processing module or the configurable tools of a set of functionally-related processing modules, the control units moveably engageable in a static frame to which the supporting rail means of the processing modules is also solidly joined to.

19. A packaging machine, comprising:

a static frame;

a track defining a closed path;

a number of carriage assemblies moveable along the track;

a main controller in electrical communication with the track and the carriage assemblies for the independent but coordinated movement of the carriage assemblies, the carriage assemblies being configured to grip a pouch so that, each carriage assembly, or cooperatively a number of successive carriage assemblies, is able to hold in a suspended fashion a flexible pouch and to convey the pouch along at least a section of the track;

a series of processing modules moveably engaged with a common supporting rail, the processing modules having configurable tools able to perform an operation on the conveyed pouches;

a corresponding series of control units, each control unit to control the configurable tools of a processing module or the configurable tools of a set of functionally-related processing modules, the control units being moveably engageable in the static frame to which the supporting rail of the processing modules is also solidly joined to; and wherein the supporting rail is dimensioned to receive the engagement of a plural number of processing modules, lined up along the supporting rail.

* * * * *